(12) United States Patent
Al Majid et al.

(10) Patent No.: US 11,113,797 B1
(45) Date of Patent: Sep. 7, 2021

(54) PASSIVE FLASH IMAGING

(71) Applicant: Snap Inc., Santa Monica, CA (US)

(72) Inventors: Newar Husam Al Majid, Santa Monica, CA (US); Nathan Kenneth Boyd, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 92 days.

(21) Appl. No.: 16/544,460

(22) Filed: Aug. 19, 2019

(51) Int. Cl.
*G06K 9/46* (2006.01)
*G06T 5/00* (2006.01)
*G06T 7/90* (2017.01)

(52) U.S. Cl.
CPC ............ *G06T 5/003* (2013.01); *G06K 9/4661* (2013.01); *G06T 7/90* (2017.01); *G06T 2207/10152* (2013.01)

(58) Field of Classification Search
CPC . G06T 5/003; G06T 7/90; G06T 2207/10152; G06K 9/4661
USPC ........................................................ 382/274
See application file for complete search history.

(56) References Cited

U.S. PATENT DOCUMENTS

| | | | | |
|---|---|---|---|---|
| 10,089,809 | B1* | 10/2018 | Daly | G06Q 10/00 |
| 2011/0257496 | A1* | 10/2011 | Terashima | A61B 5/14532 600/347 |
| 2015/0131870 | A1* | 5/2015 | Hudson | G06F 3/0483 382/112 |
| 2015/0181101 | A1* | 6/2015 | Ciudad | H04N 7/141 348/371 |
| 2018/0359410 | A1* | 12/2018 | Ain-Kedem | H04N 5/232123 |
| 2019/0130161 | A1* | 5/2019 | Chang | G06T 7/35 |
| 2019/0227419 | A1* | 7/2019 | Mcnelley | G03B 21/2033 |
| 2020/0099867 | A1* | 3/2020 | Sugimoto | H04N 5/243 |

* cited by examiner

*Primary Examiner* — Ali Bayat
(74) *Attorney, Agent, or Firm* — Schwegman Lundberg & Woessner, P.A.

(57) ABSTRACT

A passive flash system for illuminating images being captured on a user device while maintaining preview of the content being captured. The passive flash system can display a portion of a screen in as an elevated brightness element that is brighter than the content being captured. The elevated brightness element can surround or overlap the content being captured to passively increase the lighting of the imaged environment.

19 Claims, 14 Drawing Sheets

PASSIVE FLASH IMAGING

TECHNICAL FIELD

The present disclosure generally relates to special-purpose machines that manage image processing and improvements to such variants, and to the technologies by which such special-purpose machines become improved compared to other special-purpose machines for generating images.

BACKGROUND

Conventionally, it is preferred that the subject of an image is adequately illuminated otherwise the image will be too dark (e.g., in the case of low light levels) or adequately illuminated but blurry (e.g., in the case of long exposure times). A flash or light source can be implemented to add light to the imaged environment, however a flash or external light source may not be available at the time the image is being captured. Furthermore, in some situations, such as a dimly lit restaurant or dimly lit concert seats, the use of a flash may be inappropriate as it would annoy other people nearby.

BRIEF DESCRIPTION OF THE DRAWINGS

To easily identify the discussion of any particular element or act, the most significant digit or digits in a reference number refer to the figure ("FIG.") number in which that element or act is first introduced.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed, it is preferable to properly light a subject to be captured in an image or video, however in some cases adequate lighting is unavailable or impractical. For example, a user of a user device (e.g., smartphone) may seek to record themselves in "selfie" mode via a front facing camera while previewing the content being recorded live on the user device's screen. If the user is in a dark environment, the user may turn the user device around to utilize a backside camera with a flash; however, the user cannot then view the content as it is being recorded (as the screen would be facing away from the user). Even if a device has a front side flash or external flash, utilizing the flashes may not be appropriate if the user is a dark environment with other people nearby. Some conventional approaches recolor the entire screen of the client device momentarily while the content is being captured so as to more thoroughly illuminate the subject, however such approaches disruptive of the image capture experience (e.g., the recolored screen disrupts the view of the content being imaged).

To this end, a passive flash system can display a passive flash element that increases the lighting of the imaged environment while the content is still live and pre-viewable on the user device screen. In some example embodiments, the passive flash element is a ring or patch of the screen that is not being utilized to display the live video. For example, the passive flash element may be implemented as a ring that appears around a live video preview window or patches of brightly lit or colored UI content that is directly overlapping portions of the live video screen. In some example embodiments, the passive flash element is brighter due to generating more light (e.g., from increased voltage being supplied to pixel elements), while in other embodiments the passive flash element is brighter due to brighter colors being displayed by the pixels that depict the flash element (e.g., a white pixel causing lighter than a dark blue pixel). In this way, users can implement a passive flash element to capture an image or video clip that is adequality lit in such a way that does not degrade the imaging user experience for the user and does not annoy nearby users with excessive lighting.

Figure 1:
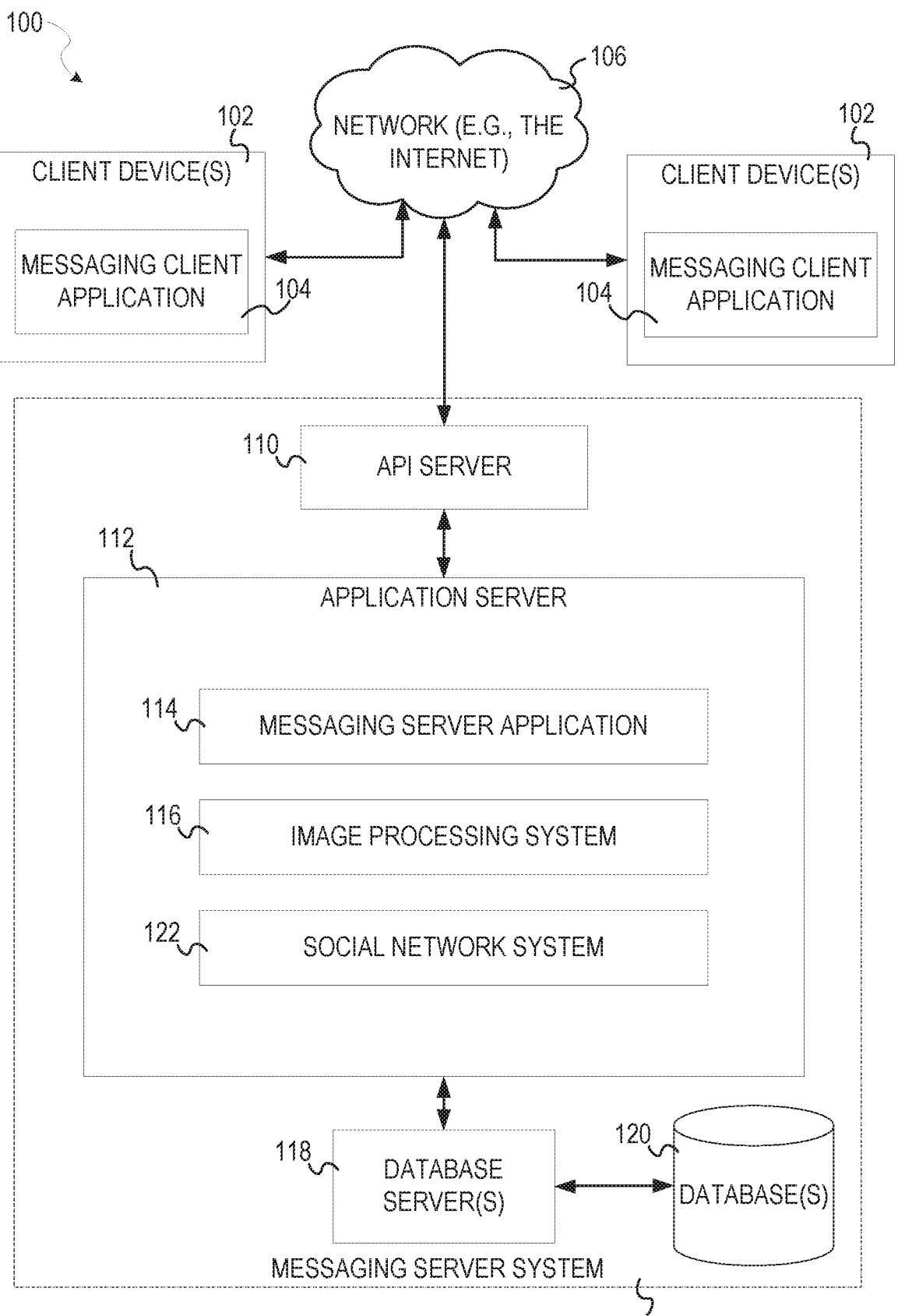
FIG. 1 is a block diagram showing an example messaging system for exchanging data (e.g., messages and associated content) over a network, according to example embodiments.

FIG. 1 shows a block diagram of an example messaging system 100 for exchanging data (e.g., messages and associated content) over a network 106. The messaging system 100 includes multiple client devices 102, each of which hosts a number of applications including a messaging client application 104. Each messaging client application 104 is communicatively coupled to other instances of the messaging client application 104 and a messaging server system 108 via the network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text; audio, video; or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, and to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions; social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client devices 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections: the retrieval of a list of friends of a user of a client device 102; the retrieval of messages and content; the adding and deletion of friends to and from a social graph; the location of friends within the social graph; and opening application events (e.g., relating to the messaging client application 104).

The application server 112 hosts a number of applications and subsystems, including the messaging server application 114, an image processing system 116, and a social network system 122. The messaging server application 114 implements a number of message-processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph (e.g., entity graph 304 in FIG. 3) within the database 120. Examples of functions and services supported by the social network system 122 include the identification of other users of the messaging system 100 with whom a particular user has relationships or whom the particular user is "following," and also the identification of other entities and interests of a particular user. The application server 112 is communicatively coupled to a database server 118, which facilitates access to a database 120 in which is stored data associated with messages processed by the messaging server application 114.

Figure 2:
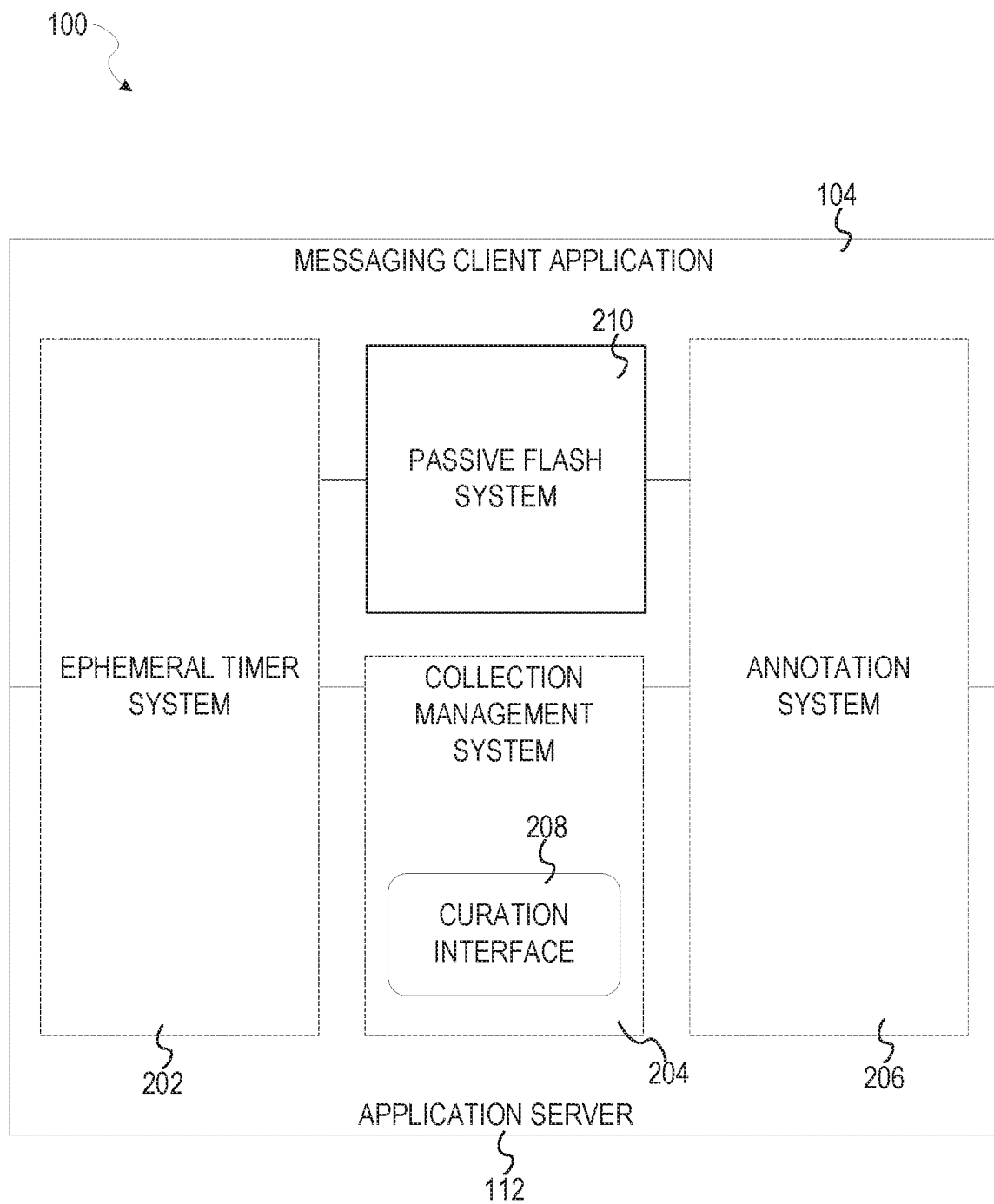
FIG. 2 is a block diagram illustrating further details regarding the messaging system of FIG. 1, according to example embodiments.

FIG. 2 is a block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, an annotation system 206, and a passive flash system 210.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story," Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a geofilter or filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, text, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which particular content should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

As discussed in further detail below, passive flash system 210 manages passive or non-disruptive lighting of the imaged content, as discussed in further detail below.

Figure 3:
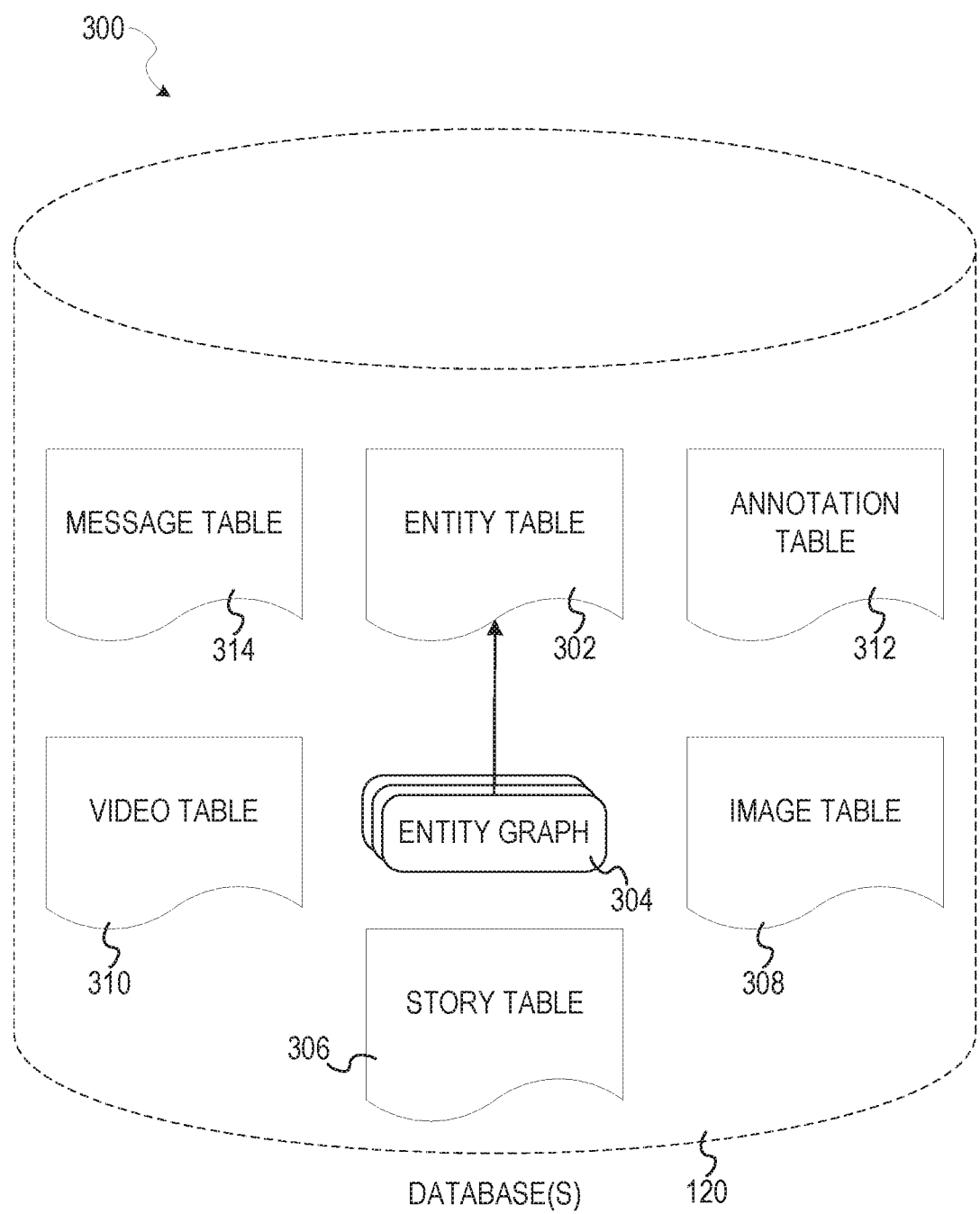
FIG. 3 is a schematic diagram illustrating data which may be stored in a database of a messaging server system, according to certain example embodiments.

FIG. 3 is a schematic diagram illustrating data 300 which may be stored in the database 120 of the messaging server system 108, according to certain example embodiments. While the content of the database 120 is shown to comprise a number of tables, it will be appreciated that the data 300 could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interest-based, or activity-based, for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a created stream of user-submitted content from various locations and events. Users whose client devices 102 have location services enabled and are at a common location or event at a particular time may, for example, be presented with an option, via a user interface of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
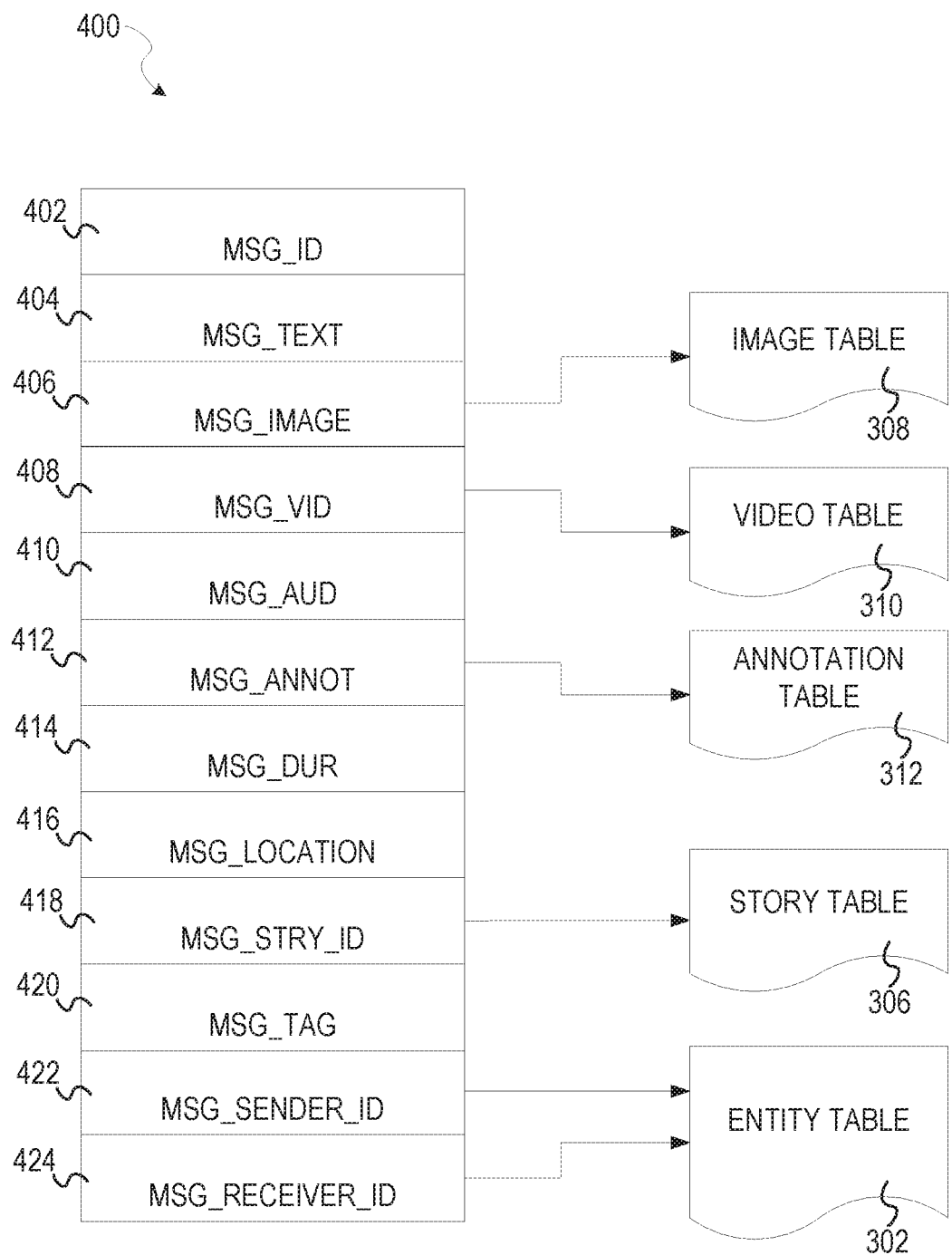
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data captured by a camera component of a client device 102 or retrieved from memory of a client device 102, and that is included in the message 400.

A message video payload 408: video data captured by a camera component or retrieved from a memory component of the client device 102, and that is included in the message 400.

A message audio payload 410: audio data captured by a microphone or retrieved from the memory component of the client device 102, and that is included in the message 400.

Message annotations 412: annotation data (e.g., filters, stickers, or other enhancements) that represents annotations to be applied to the message image payload 406; message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.

A message geolocation parameter 416: geolocation data (e.g., latitudinal and longitudinal coordinates) associated with the content payload of the message 400. Multiple message geolocation parameter 416 values may be included in the payload, with each of these parameter values being associated with respective content items included in the content (e.g., a specific image in the message image payload 406, or a specific video in the message video payload 408).

A message story identifier 418: values identifying one or more content collections (e.g., "stories") with which a particular content item in the message image payload 406 of the message 400 is associated. For example, multiple images within the message image payload 406 may each be associated with multiple content collections using identifier values.

A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message annotations 412 may point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
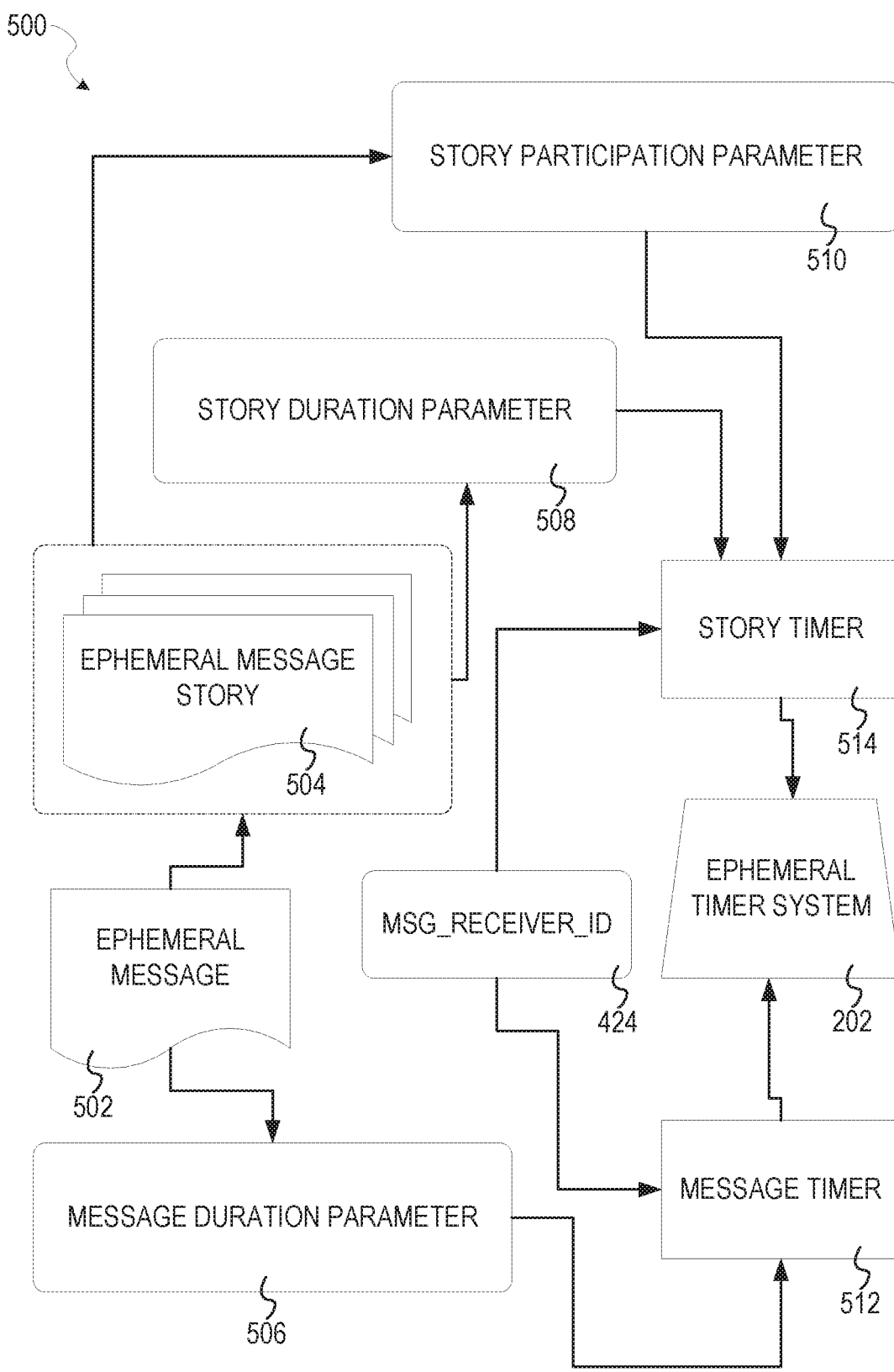
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral), according to some example embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral), according to some example embodiments.

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is an application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message tinier 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In response to the ephemeral timer system 202 determining that an ephemeral message story 504 has expired (e.g., is no longer accessible), the ephemeral tinier system 202 communicates with the messaging system 100 (e.g., specifically, the messaging client application 104) to cause an indicium (e.g., an icon) associated with the relevant ephemeral message story 504 to no longer be displayed within a user interface of the messaging client application 104.

Figure 6:
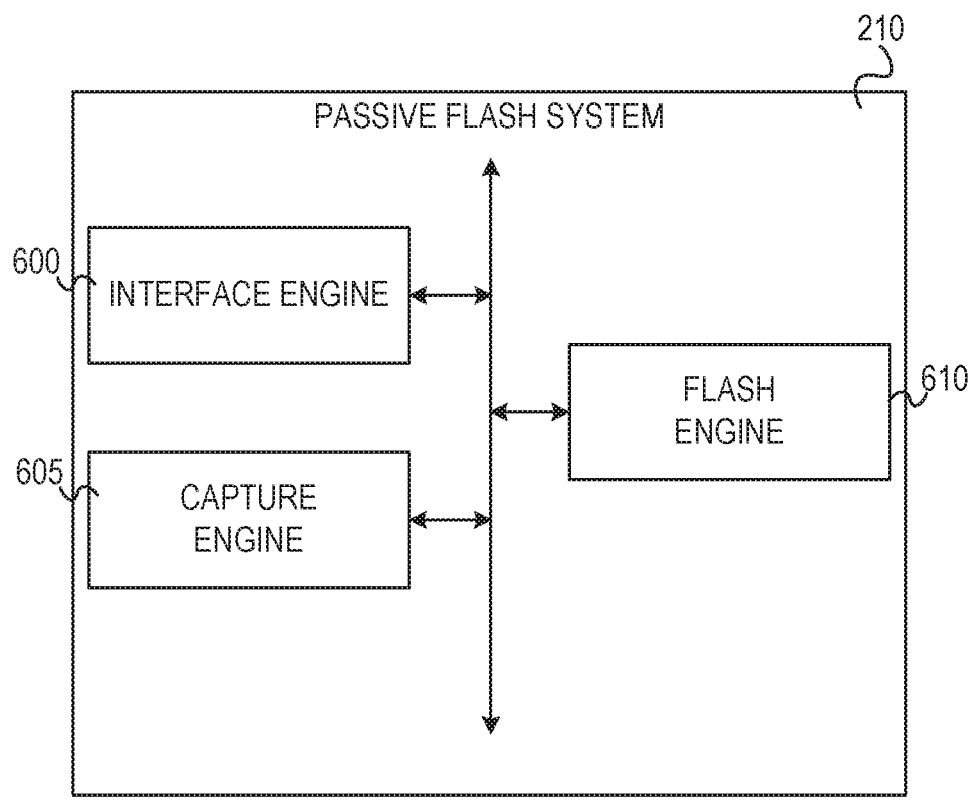
FIG. 6 shows example functional engines of a passive flash system, according to some example embodiments.

FIG. 6 shows example functional engines of a passive flash system 210, according to some example embodiments. As illustrated, the passive flash system 210 comprises an interface engine 600, a capture engine 605, and a flash engine 610. The interface engine 600 is configured to generate user interface elements (e.g., buttons, windows) to display content and receive selections from a user of the client device 102 (e.g., a user device, such as a smartphone). The capture engine 605 is configured to generate images, such an image, an image sequence, or live video that is captured and displayed on the client device 102 in real-time or near real time. As used herein, real-time or near real-time denotes a dynamic live imaging pipeline that captures image content and displays the image content as soon as the content is available for display on the user device. The flash engine 610 is configured to generate an elevated brightness element that is displayed on the display device of the user device while a live preview window is displaying image content. As used below, the elevated brightness element is referred to as a live flash that illuminates the imaged objects passively such that a live preview of the content to be captured is not disrupted. That is, for example, the live flash allows a user to view themselves through a front facing camera as passively lit by the live flash, as discussed in further detail below.

Figure 7:
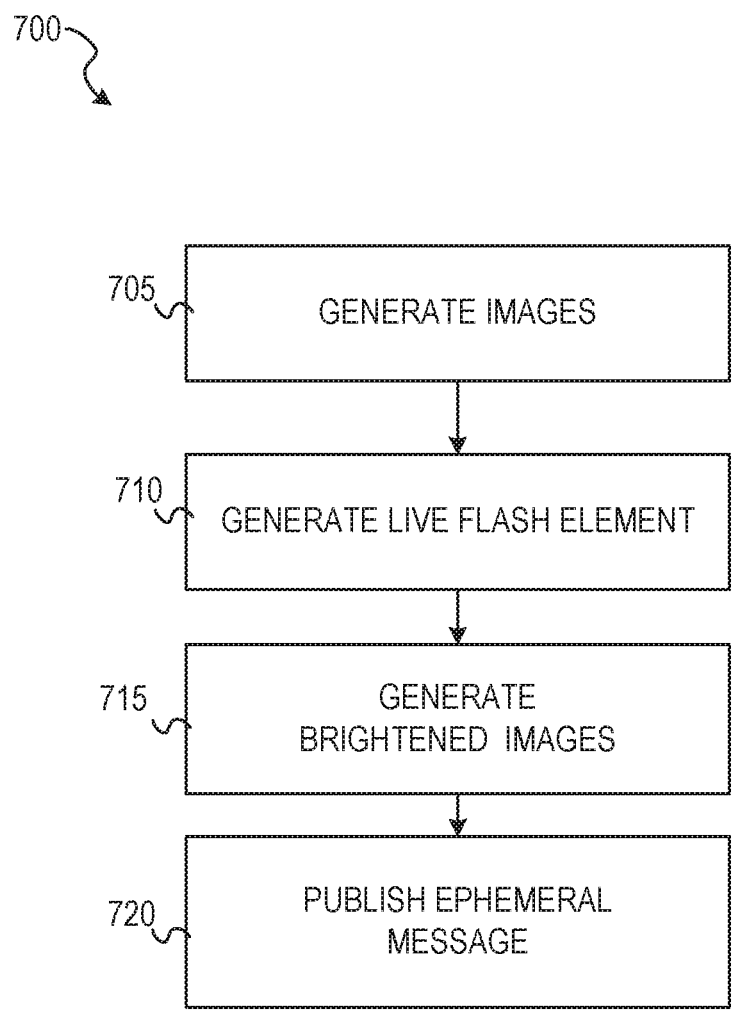
FIG. 7 shows an example flow diagram of a method for implementing a passive flash for generating image content, according to some example embodiments.

FIG. 7 shows an example flow diagram of a method 700 for implementing a passive flash for generating image content, according to some example embodiments. At operation 705, the capture engine 605 generates one or more images. For example, at operation 705 the capture engine 605 generates live video that is captured via a front facing camera and displays the live video on a user device screen in real-time or in near real time. At operation 710, the flash engine 610 generates a live flash element on a portion of the screen, while the screen is simultaneously displaying the live video. For example, the screen can include an application user interface (e.g., user interface of application 104) in which a live preview window plays the live video and another window or area displays live flash. The example live flash data can include bright monotone color data, such as all white pixels, all yellow pixels, all orange pixels, and so on.

At operation 715, the capture engine 605 generates brightened images while the live flash is activated. For example, while the live flash is displayed on the screen, the capture engine 605 generates an image using the front facing camera of the user device that is generating the live video. As discussed, because the live flash element is being displayed the environment is more brightly illuminated and the user can view themselves in the live preview area without disrupting the display of the live video. Additionally, the live flash allows capturing of not only images, but live video sequences that are illuminated by the simultaneously displayed passive live flash. At operation 720, the passive flash system 210 publishes the generated images in an ephemeral message, such as ephemeral message 540 as discussed above.

Figure 8:
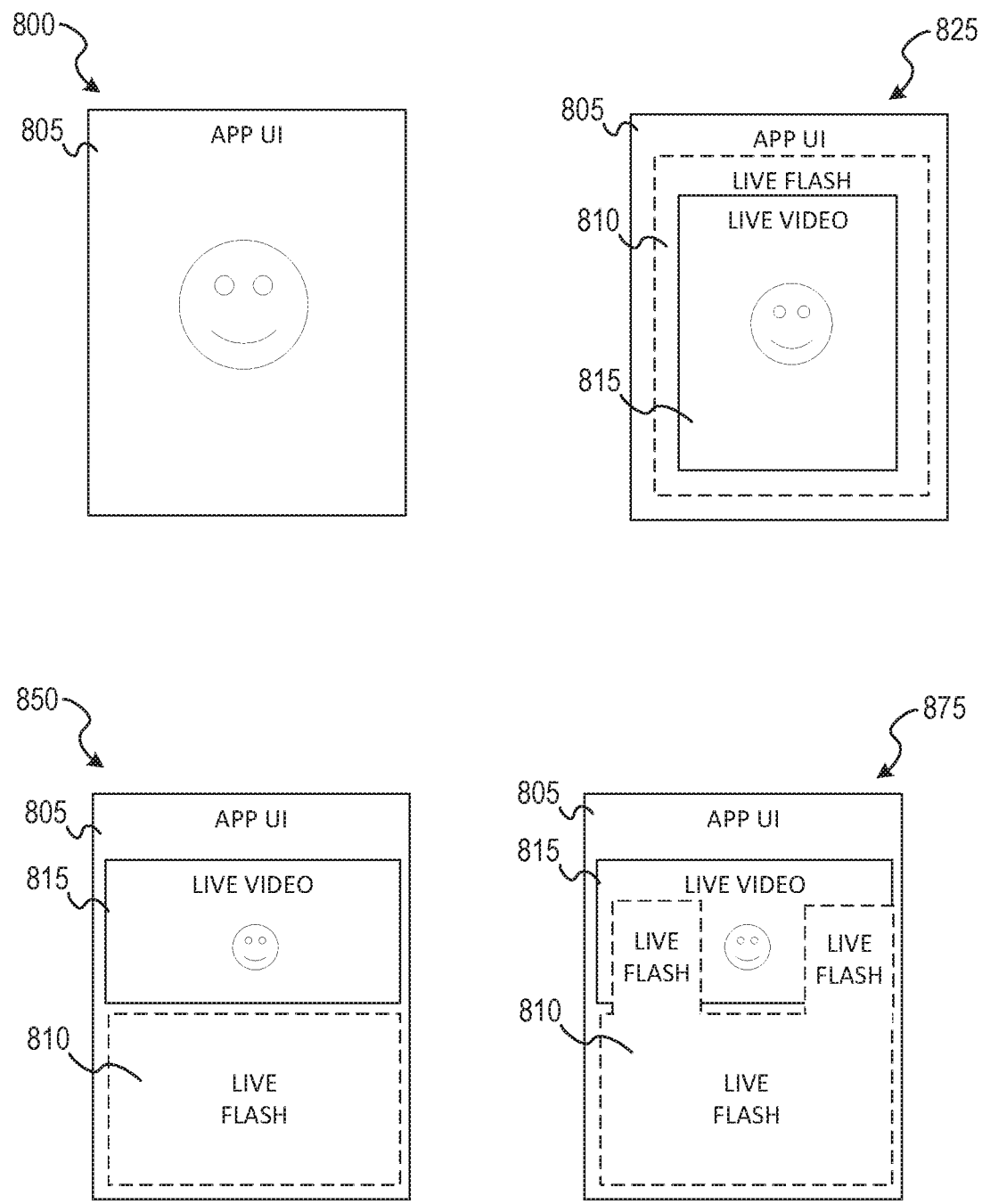
FIG. 8 show different configurations of a passive flash elements, according to some example embodiments.

FIG. 8 show different configurations of a passive flash elements, according to some example embodiments. In configuration 800, an application user interface 805 is displaying the live video in full screen mode (e.g., the live video window extends to all sides of the application user interface 805). Upon the live flash being activated (e.g., via button selection, switching from rear camera to front camera, or darkness threshold analysis), the live flash is displayed with the live video to enable a user to preview how an image will appear before or while the image data is captured and stored.

For example, in the ring configuration 825 the live flash 810 is a ring user interface element that circumscribes the live video window 815. In some example embodiments, upon the flash engine 610 being initiated the live video window 815 is scaled smaller (from its full screen size of configuration 800) to expose an area in which the live flash 810 is displayed.

In the external configuration 850, the live video window 815 and the live flash 810 are in different areas of application user interface 805. This may be preferable for example, where surrounding the live video with a ring element is not desired or possible per the configuration of the user device (e.g., operating system of the client device, native display of a given client device, etc.). For example, a given client device operating system may not allow resizing of live video preview areas but allow or otherwise have native functionality to display the live flash in a non-overlapping pre-existing window area or screen patch of the device's screen.

In the overlapping configuration 875, the live flash 810 is overlaid or otherwise integrated in the live video window 815. In some example embodiments, the live flash portions overlapping the live video window 815 cover up portions of the live video window 815 but leave a portion (e.g., center) uncovered to allow the user to preview the image that will be generated as lit by the light from the screen (e.g., light from the live flash and live video). The overlapped portions of the live video window 815 thereby obfuscate live video portions by completely covering up the live video portions or blurring the live video portions (e.g., the live flash window 810 can be implemented as translucent Gaussian blur layer of increased brightness that allows shapes in the live video 815 to be viewed through the live flash window 810 as blurred shapes of increased brightness). In some example embodiments, the center region of the live video is left uncovered and other portions are covered with the live flash 810 under an assumption that the subject of the image to be captured (e.g., face of the user) is likely in a center portion of the live video window 815.

In some example embodiments, the passive flash engine 610 includes a machine learning scheme that analyzes the live video to find the imaged subject (e.g., a human face). For example, the passive flash engine 610 includes an integrated image segmentation neural network that segments or labels areas of the image as belonging to different categories (e.g., background area, foreground area, face area, hands area, hair area), and image masks can be generated to indicate which pixels of the live video correspond to the different segments. In some example embodiments, the live flash 810 is implemented so as to overlap the live flash elements directly over or into the live video content. For instance, as the user's face changes location within the live video, the user's faces remains visible while other areas of the live video that do not display the user's face are repurposed as live flash illumination elements e.g., pixels showing a bright orange color instead of live video image data).

It is appreciated that the example embodiments in FIG. 8 are examples, and can be modified per different client device operating environments. For example, in configuration 875 the live video window 815 may extend in a full screen mode to completely cover the application user interface 805, and other configurations are likewise possible.

Figure 9:
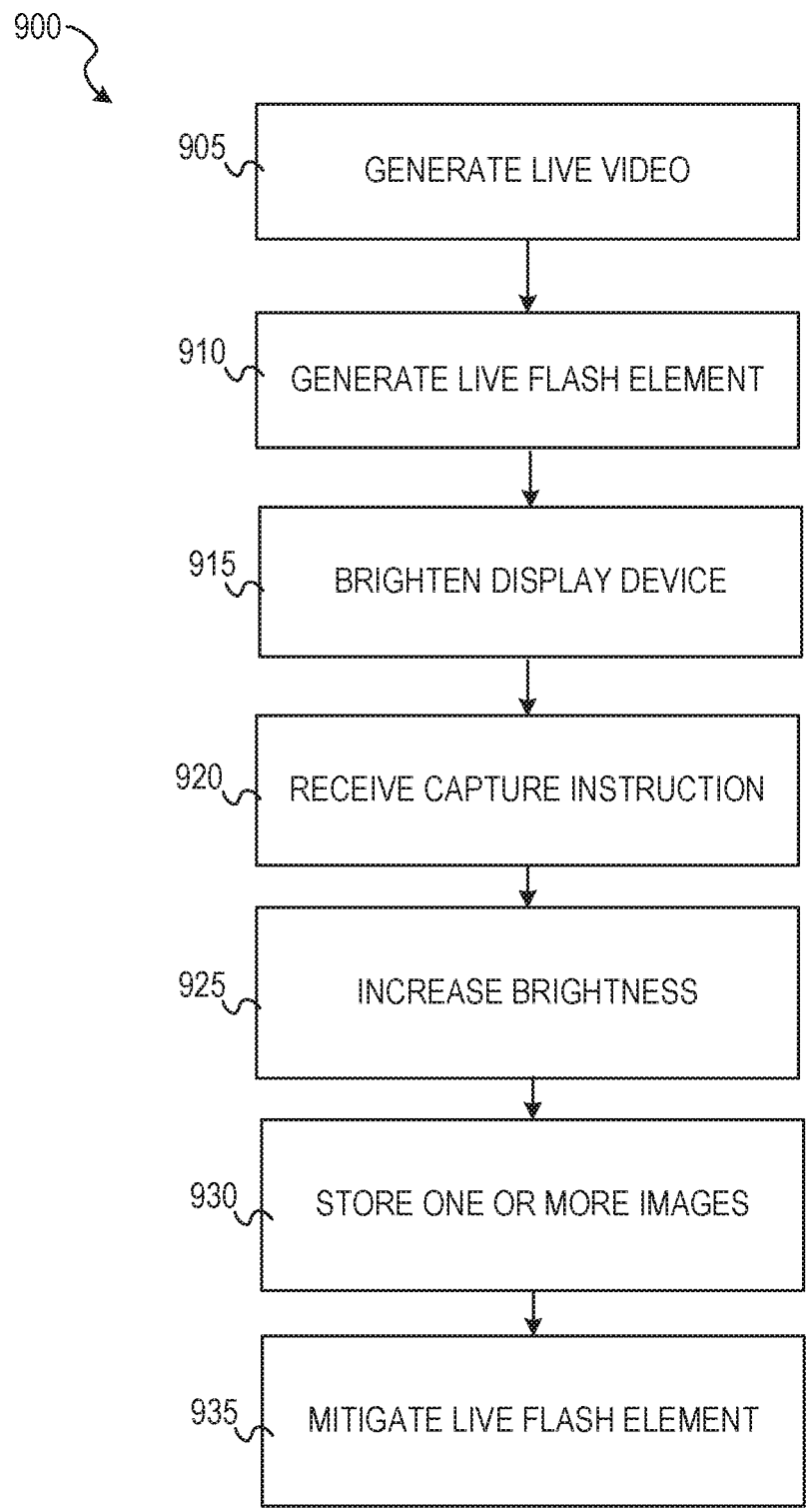
FIG. 9 shows a flow diagram of an example method for generating image content using a passive flash, according to some example embodiments.

FIG. 9 shows a flow diagram of an example method 900 for generating image content using a passive flash, according to some example embodiments. In the example of FIG. 9, the brightness of the display elements (e.g., pixels) are brightened and darkened in response to device events. At operation 905, the capture engine 605 generates live video on a display screen using a front facing camera of the user device. In some example embodiments, when the live video is generated the screen brightness of the display screen is at a default value (e.g., a default value of 20% as set by application 104, or a native value set by the client device operating system) or an arbitrary value set by the user (e.g., the user is in a dark environment and set the screen to minimum brightness to mitigate other nearby people being disturbed by the user viewing the screen).

At operation 910, the passive flash engine 610 generates a live flash (e.g., elevated brightness element) on the display screen while the live video is displayed. The passive flash engine 610 can trigger display of the live flash element in different approaches. For example, in some example embodiments, the live flash element is triggered in response to the user selecting a flash button displayed within the live preview window area.

In other example embodiments, the live flash element is triggered in response to determining that the live video being displayed is darker than a pre-configured darkness threshold. For example, the passive flash engine can aggregate the luminance or pixel values of the pixel elements displaying the live video, and if the aggregate value is lower than a pre-configured threshold value, operation 910 is triggered and the passive flash engine 610 displays the passive flash.

In some example embodiments, the live flash element is displayed automatically anytime a specific camera of the user device is activated. For example, the client device can include a rear facing camera on a backside and a front facing camera on the opposite site; on the same side as the client device screen. The user may initially be viewing live video captured by the rear facing camera within the live preview window and then switch to a front facing camera mode in which the front facing camera generates the live video content being displayed in the live preview window. In some example embodiments, upon the front facing camera being activated to generate live video within application 104, operation 910 is triggered and the live flash is displayed.

At operation 915, the passive flash engine 610 increases the brightness setting to a first value, e.g., 50% of maximum. In some example embodiments, the increasing of the brightness setting to the first value occurs simultaneously with the live flash element being displayed. That is for example, operations 910 and 915 may occur approximately at the same time, thereby displaying a live flash and increasing the brightness in one step.

At operation 920, the interface engine 600 receives an instruction to capture images. For example, the user has selected a capture button instructs the interface engine 600 to store image content. At operation 925, in response to the capture instruction being received, the flash engine 610 increases the brightness of the screen to a second elevated value, such as 60%, 90% or 100% of the maximum brightness. In some example embodiments, the brightness is elevated to the second elevated value for brief period of time (e.g., long enough to capture an image). In some example embodiments, the brightness is elevated to the second elevated level while the user is pressing and holding down the capture button to capture a live video clip.

At operation 930, while the passive flash element is at the second elevated brightness value, the capture engine 605 captures and stores one or more images. For example, at operation 930 the capture engine 605 can store one or more frames from the live video as the generated images. In some example embodiments, an auxiliary camera that is not generating the live video captures and stores the images at operation 930. That is, for example, a front facing camera generates the live video that functions as a visual preview of content to be captured, and upon the capture button being selected another auxiliary camera (e.g., another front facing camera with a portrait lens) is used to capture new image content separate from the live video for storage in the memory of the user device.

At operation 935, the passive flash engine 610 mitigates the live flash element. For example, the flash engine 610 can darken the screen setting to the initial setting (e.g., the setting in operation 915, 30% of maximum brightness, etc.) or entirely remove the flash element from display. In some example embodiments, the darkening of the screen and/or removal of the live flash element is in response to the user releasing the capture button after the images or video clip have been stored to memory. In some example embodiments, operation 935 occurs and the screen is darkened in response to other user interfaces of the application 104 being displayed. That is, for example, a user may view the live video and the screen may be brightened via the live flash and the increased brightness settings, and when the user navigates to another screen of application 104 (e.g., a chat window, newsfeed, terminates application 104, etc.) the live flash element is removed and/or the screen is darkened so as to not cause excessive illumination in a dark environment.

Figure 10:
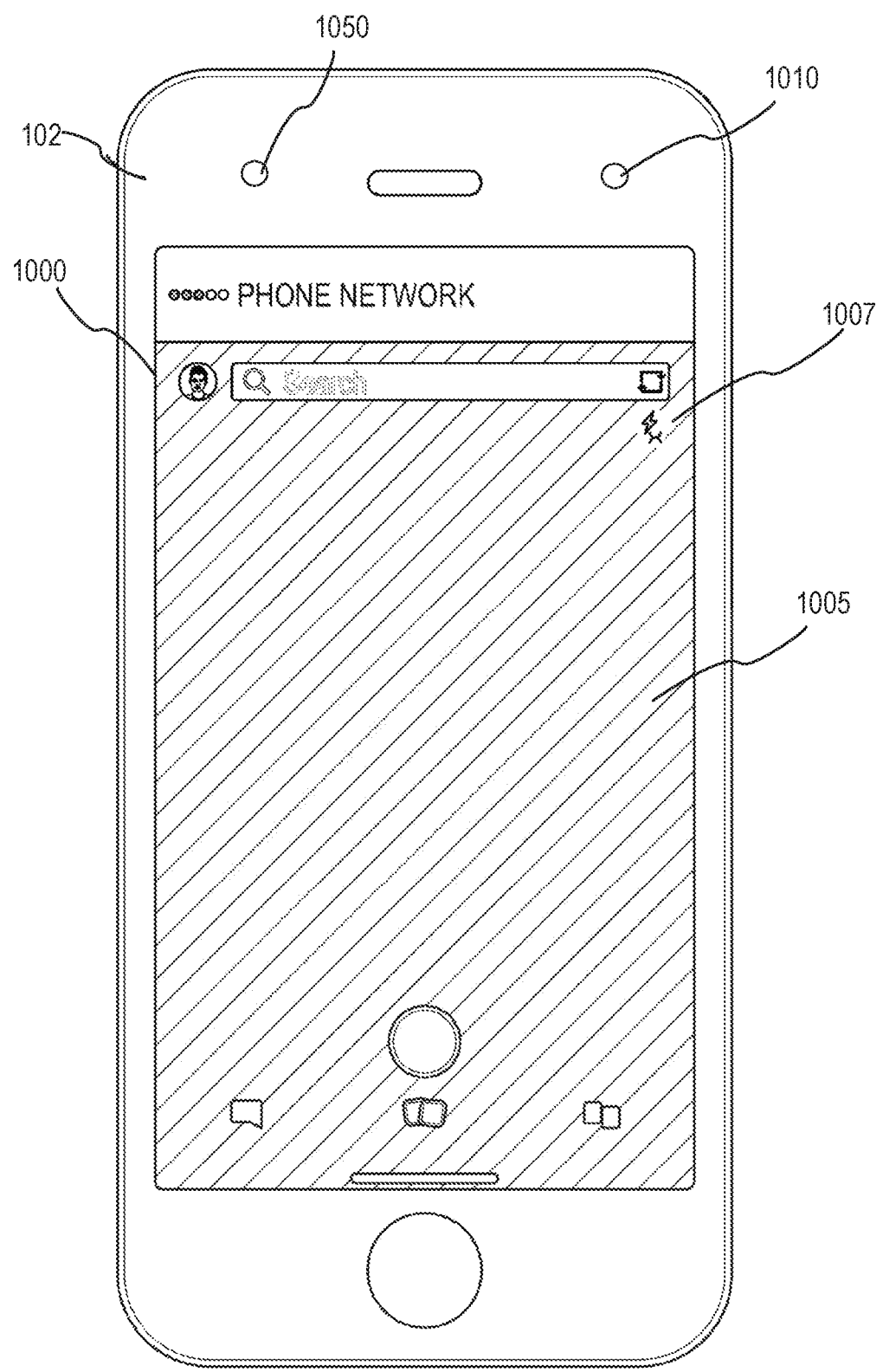
FIGS. 10-12 show example user interfaces for implementing a passive flash, according to some example embodiments.

FIG. 10 shows an example embodiment of client device 102 displaying an application user interface 1000 that is displaying live video 1005 generated by a front facing camera 1010 of the client device 102. As illustrated, the live video 1005 is empty and dark due to the client device 102 being in a dark environment. The example client device 102 further comprises a second front facing camera 1050, that can be utilized as an auxiliary camera, as discussed above.

Figure 11:
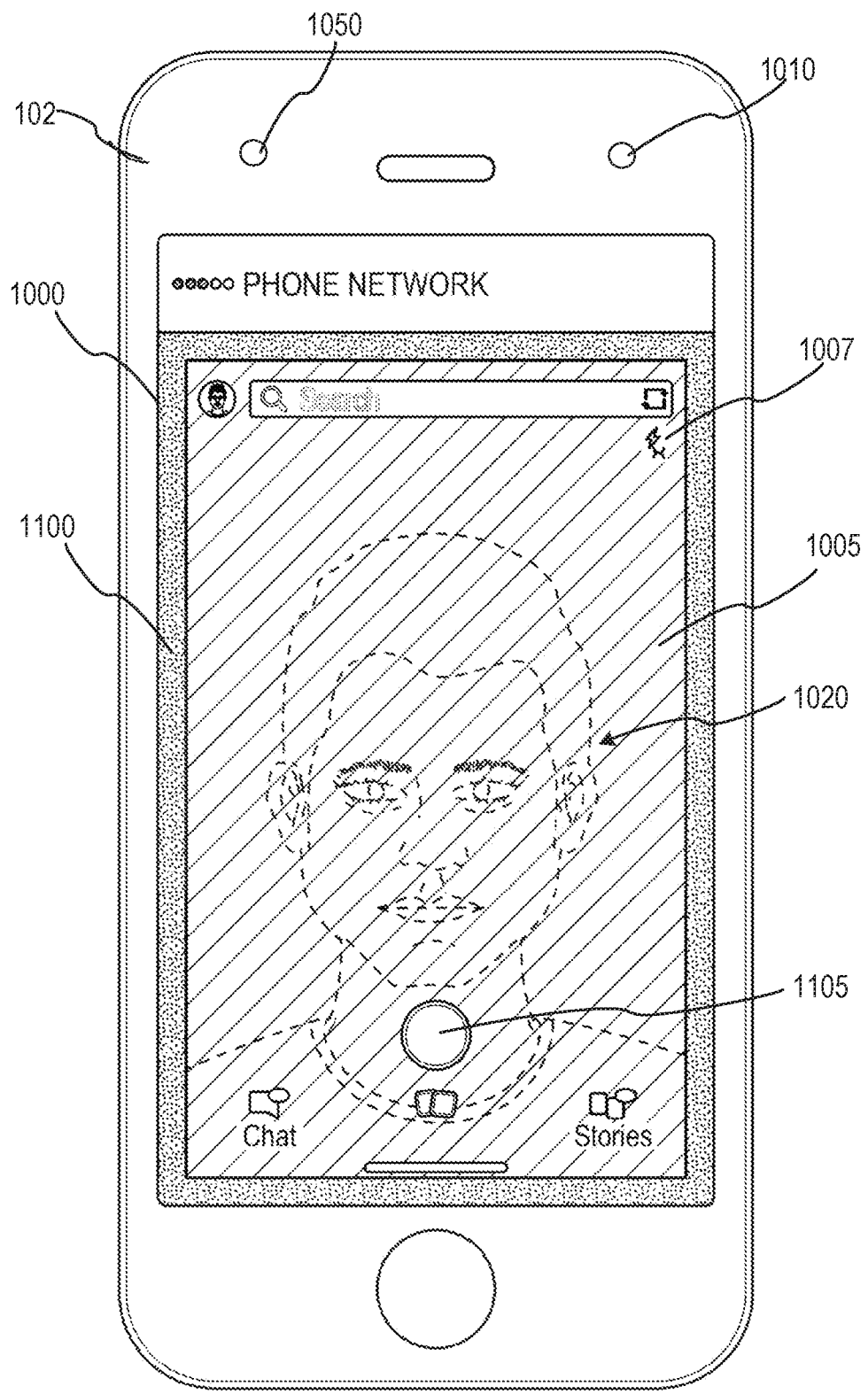

FIG. 11 shows the client device 102 with a live flash element 1100 in medium brightness mode, according to some example embodiments. In the example of FIG. 11, the live flash element 1100 is a ring that surrounds the live video 1005. In some example embodiments, the live flash element 1100 is displayed in response to the user selecting a front flash button 1007 that allows the user to preview what they will look like if they capture an image as illuminated by the flash element 1100 (and further illuminated by supplementary light from the pixels showing the live video 1005, as understood by one of ordinary skill). In some example embodiments, the live flash element 1100 is a portion of the application user interface 1000 that has been exposed due to the live video 1005 being scaled smaller. The live flash element 1100 may appear brighter than the live video 1005 due to a brighter color being used (e.g., orange, white) than the colors of the content being displayed in the live video 1005. Additionally, the live flash element 1100 is brightened due to the increased brightness of the entire screen of client device 102, where the brightness more greatly affects the live flash element 1100 as it is brightly lit color; though it is appreciated that, in some example embodiments, in response to the global screen brightness being increased the live video 1005 also generates more light which provides supplementary illumination. In some example embodiments, the screen of the client device 102 is configured to allow the brightness of some pixels to be increased while other the brightness of other pixels remains static. That is, for example, only the pixels used to display the flash element 1100 receive a higher voltage thereby generating more light whereas the pixels used to display the live video 1005 do not receive higher voltage and remain at constant brightness (e.g., minimum brightness, 30%, etc.). In some example embodiments, the live flash element 1100 does not depict bright colors but rather dark colors (e.g., dark gray, blue, black) and the increased brightness of the live flash element 1100 is triggered by increasing the voltage of only the pixels used to display the live flash element 1100. In those example embodiments, the dark colored but more brightly illuminated live flash element 1100 may provide more subtle or passive illumination of the user 1020 without disturbing other nearby people, whereas a bright white or orange light would be more disruptive.

Figure 12:
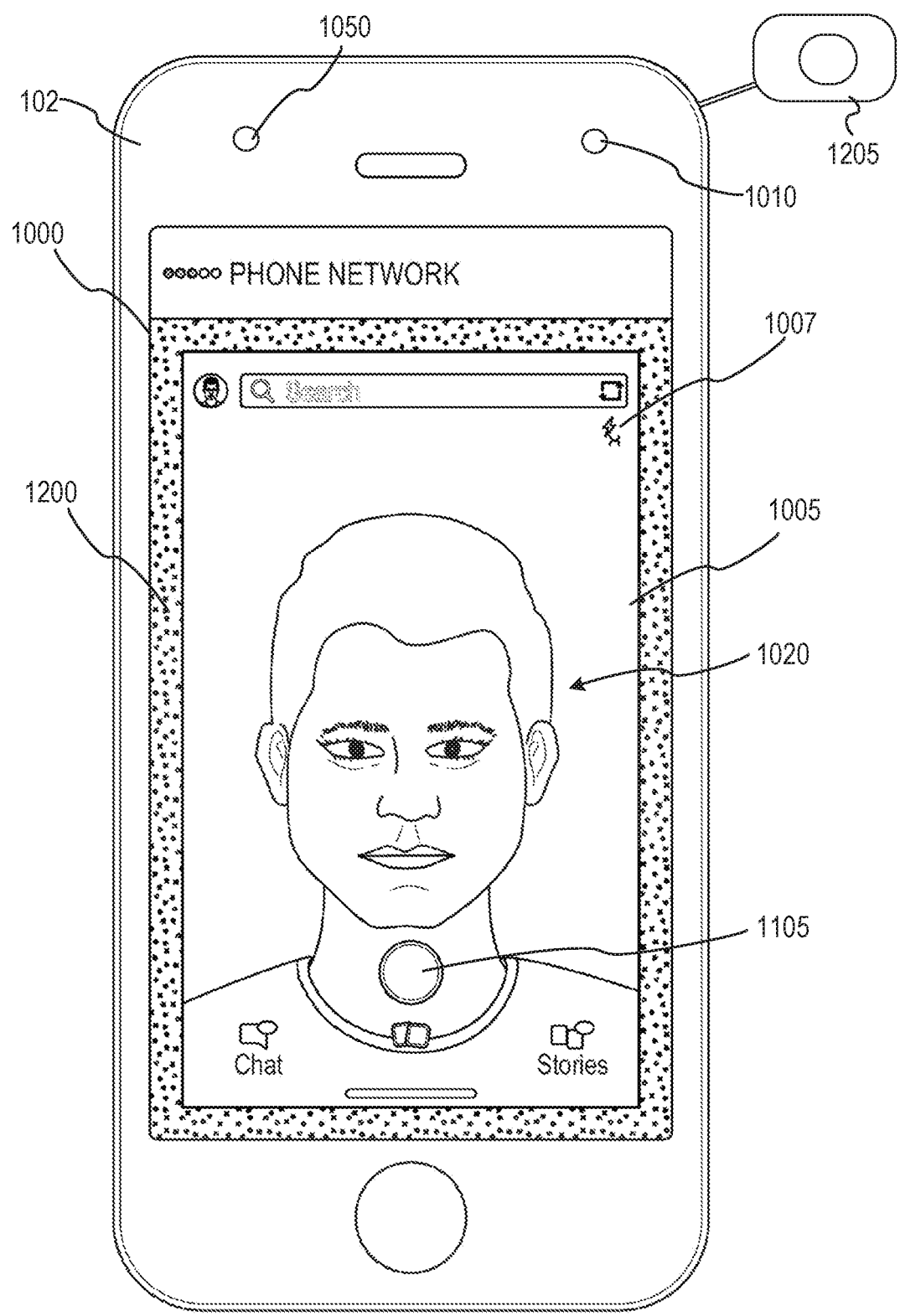

FIG. 12 shows the client device 102 with a live flash element 1200 in elevated brightness mode, according to some example embodiments. In the illustrated example, the user selects (e.g., taps on) the capture button 1105 and in response to the capture button 1105 being selected the live flash element 1100 of FIG. 11 transitions to an elevated brightness mode of flash element 1200 (as noted by bigger dot pattern) that better illuminates the user 1020 in the live video. For example, whereas the flash element 1100 may be at some initial or medium brightness setting 50%, the flash element 1200 is at a higher or maximum value to maximize lighting while image content is captured. In some example embodiments, the live flash element brightness is increased by changing the display setting brightness for the entire screen to a higher setting. In some example embodiments, the live flash element brightness is increased by only increasing the brightness of pixels used to depict the flash element, as discussed above.

In some example embodiments, the screen brightness setting is not adjusted, and illumination is increased solely due to the bright colors (e.g., bright orange) of the live flash element 1100. Further, in some example embodiments, the colors depicted by the live flash may transition from a first brightness level to a second brightness level via color transitions. For example, in the embodiment of FIG. 11, the live flash element 1100 can depict dark red pixels which allow the user to preview themselves but not in a disruptive manner as red light is generally less disruptive to the human eye in dark environments. Further, in response to the user selecting capture button 1105, the live flash element 1100 changes to element 1200 in FIG. 12 by transitioning from dark red pixels to bright pure white pixels while the image content is captured and stored, before returning to dark red or being removed from the screen.

FIG. 12 further displays an example of an auxiliary camera 1205 that can be implemented for capturing images while the live flash element 1200 is illuminating the user 1020. That is, for example, the live flash element 1200 brightens the user and the user can view the live video 1005 as captured by the first camera 1010 as a low-light preview of how the captured content will appear. Then, in response to the capture button 1105 being selected, the auxiliary camera 1205 (e.g., a high-end DSLR connected to client device 102 via cord or wirelessly) captures one or more images that are stored or shared as an ephemeral message. Similarly, in some example embodiments, the front facing camera 1010 is used to generate the live video preview content while a second front facing camera 1050 captures image content.

Figure 13:
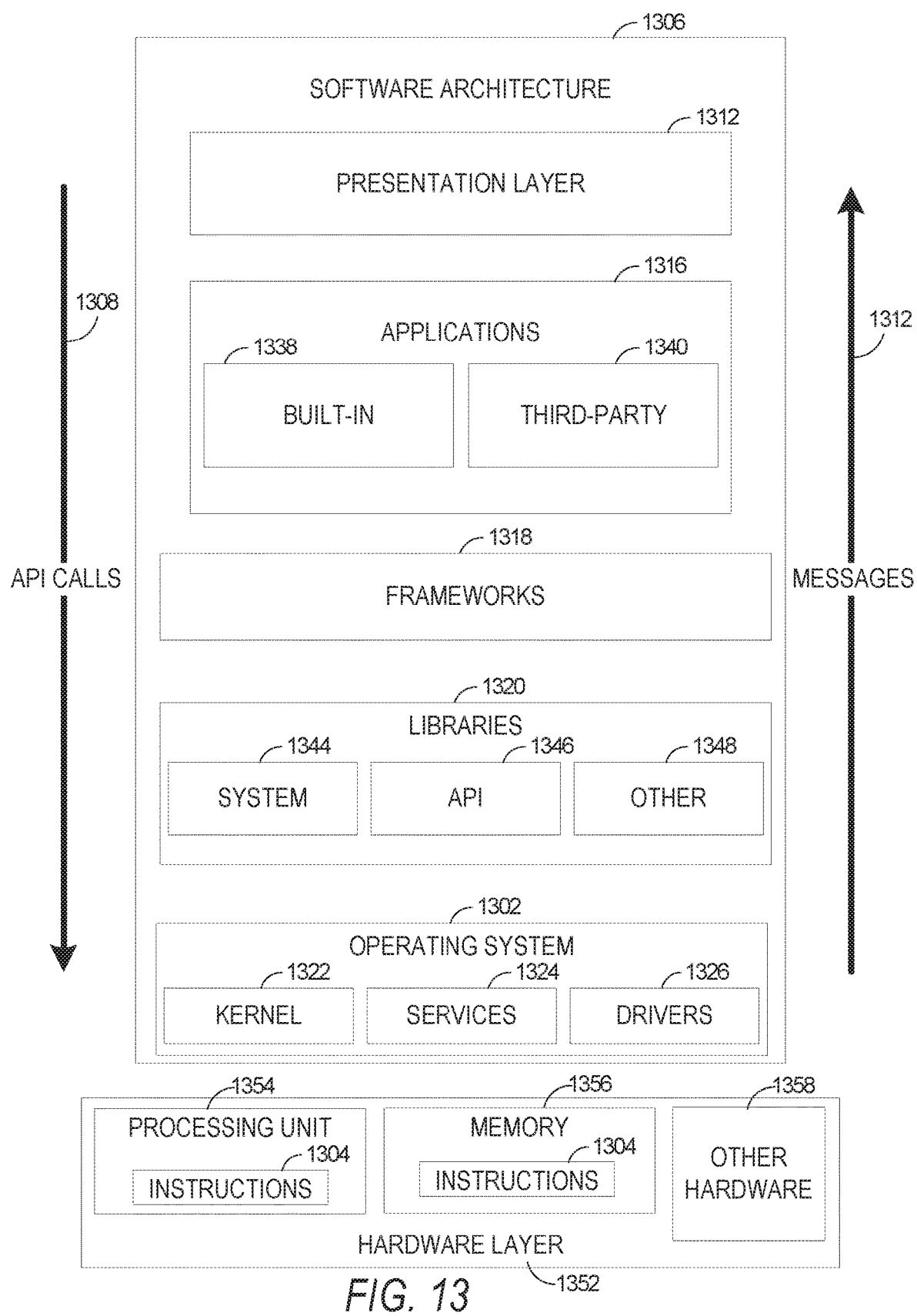
FIG. 13 is a block diagram illustrating a representative software architecture, which may be used in conjunction with various hardware architectures herein described.

FIG. 13 is a block diagram illustrating an example software architecture 1306, which may be used in conjunction with various hardware architectures herein described. FIG. 13 is a non-limiting example of a software architecture, and it will be appreciated that many other architectures may be implemented to facilitate the functionality described herein. The software architecture 1306 may execute on hardware such as a machine 1400 of FIG. 14 that includes, among other things, processors, memory, and I/O components. A representative hardware layer 1352 is illustrated and can represent, for example, the machine 1400 of FIG. 14. The representative hardware layer 1352 includes a processing unit 1354 having associated executable instructions 1304. The executable instructions 1304 represent the executable instructions of the software architecture 1306, including implementation of the methods, components, and so forth described herein. The hardware layer 1352 also includes a memory/storage 1356, which also has the executable instructions 1304. The hardware layer 1352 may also comprise other hardware 1358.

In the example architecture of FIG. 13, the software architecture 1306 may be conceptualized as a stack of layers where each layer provides particular functionality. For example, the software architecture 1306 may include layers such as an operating system 1302, libraries 1320, frameworks/middleware 1318, applications 1416, and a presentation layer 1313. Operationally, the applications 1416 and/or other components within the layers may invoke API calls 1308 through the software stack and receive a response in the form of messages 1312. The layers illustrated are representative in nature and not all software architectures have all layers. For example, some mobile or special-purpose operating systems may not provide a frameworks/middleware 1318, while others may provide such a layer. Other software architectures may include additional or different layers.

The operating system 1302 may manage hardware resources and provide common services. The operating system 1302 may include, for example, a kernel 1322, services 1324, and drivers 1326. The kernel 1322 may act as an abstraction layer between the hardware and the other software layers. For example, the kernel 1322 may be responsible for memory management, processor management (e.g., scheduling), component management, networking, security settings, and so on. The services 1324 may provide other common services for the other software layers. The drivers 1326 are responsible for controlling or interfacing with the underlying hardware. For instance, the drivers 1326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1320 provide a common infrastructure that is used by the applications 1416 and/or other components and/or layers. The libraries 1320 provide functionality that allows other software components to perform tasks in an easier fashion than by interfacing directly with the underlying operating system 1302 functionality (e.g., kernel 1322, services 1324, and/or drivers 1326). The libraries 1320 may include system libraries 1344 (e.g., C standard library) that may provide functions such as memory allocation functions, string manipulation functions, mathematical functions, and the like. In addition, the libraries 1320 may include API libraries 1346 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1320 may also include a wide variety of other libraries 1348 to provide many other APIs to the applications 1416 and other software components/modules.

The frameworks/middleware 1318 provide a higher-level common infrastructure that may be used by the applications 1416 and/or other software components/modules. For example, the frameworks/middleware 1318 may provide various graphic user interface (GUI) functions, high-level resource management, high-level location services, and so forth. The frameworks/middleware 1318 may provide a broad spectrum of other APIs that may be utilized by the applications 1416 and/or other software components/modules, some of which may be specific to a particular operating system 1302 or platform.

The applications 1316 include built-in applications 1338 and/or third-party applications 1340. Examples of representative built-in applications 1338 may include, but are not limited to, a contacts application, a browser application, a book reader application, a location application, a media application, a messaging application, and/or a game application. The third-party applications 1340 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1340 may invoke the API calls 1308 provided by the mobile operating system (such as the operating system 1302) to facilitate functionality described herein.

The applications 1416 may use built-in operating system functions (e.g., kernel 1322, services 1324, and/or drivers 1326), libraries 1320, and frameworks/middleware 1318 to create user interfaces to interact with users of the system. Alternatively, or additionally, in some systems, interactions with a user may occur through a presentation layer, such as the presentation layer 1313. In these systems, the application/component "logic" can be separated from the aspects of the application/component that interact with a user.

Figure 14:
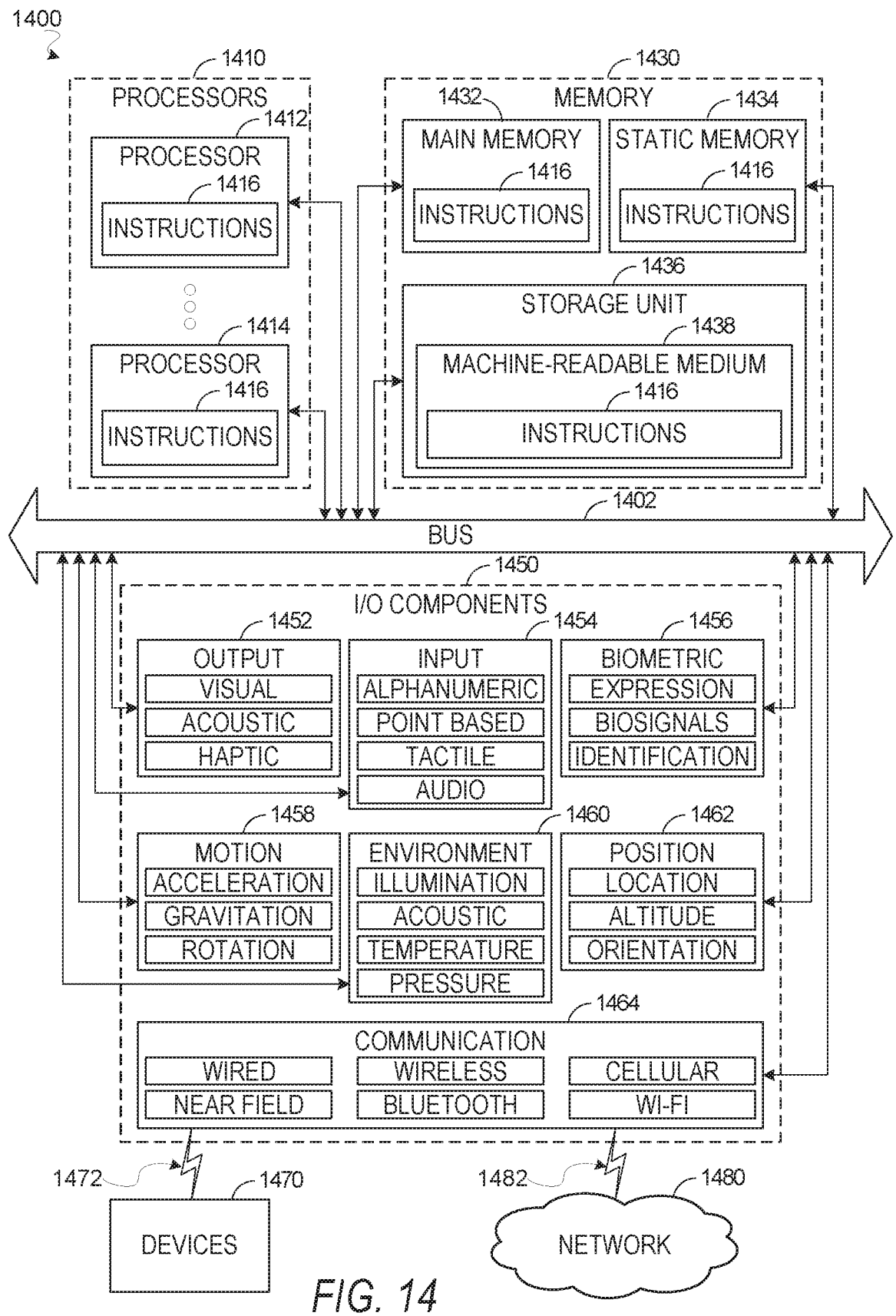
FIG. 14 is a block diagram illustrating components of a machine, according to some example embodiments, able to read instructions from a machine-readable medium (e.g., a machine-readable storage medium) and perform any one or more of the methodologies discussed herein.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. As such, the instructions 1456 may be used to implement modules or components described herein. The instructions 1416 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines that individually or jointly execute the instructions 1416 to perform any one or more of the methodologies discussed herein.

The machine 1400 may include processors 1410, memory/storage 1430, and I/O components 1450, which may be configured to communicate with each other such as via a bus 1402. The memory/storage 1430 may include a main memory 1432, static memory 1434, and a storage unit 1436, both accessible to the processors 1410 such as via the bus 1402. The storage unit 1436 and memory 1432 store the instructions 1416 embodying any one or more of the methodologies or functions described herein. The instructions 1416 may also reside, completely or partially, within the memory 1432, within the storage unit 1436 (e.g., on machine readable-medium 1438), within at least one of the processors 1410 (e.g., within the processor cache memory accessible to processors 1412 or 1414), or any suitable combination thereof, during execution thereof by the machine 1400. Accordingly, the memory 1432, the storage unit 1436, and the memory of the processors 1410 are examples of machine-readable media.

The I/O components 1450 may include a wide variety of components to receive input, provide output, produce output, transmit information, exchange information, capture measurements, and so on. The specific I/O components 1450 that are included in a particular machine 1400 will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environment components 1460, or position components 1462 among a wide array of other components. For example, the biometric components 1456 may include components to detect expressions (e.g., hand expressions, facial expressions, vocal expressions, body, gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1458 may include acceleration sensor components (e.g., accelerometer), gravitation sensor components, rotation sensor components gyroscope), and so forth. The environment components 1460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1462 may include location sensor components a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 may include a network interface component or other suitable device to interface with the network 1480. In further examples, the communication components 1464 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a USB).

Moreover, the communication components 1464 may detect identifiers or include components operable to detect identifiers. For example, the communication components 1464 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF418, Ultra Code, UCC RSS-2D barcode, and other optical codes), or acoustic detection components (e.g., microphones to identify tagged audio signals). In addition, a variety of information may be derived via the communication components 1464, such as location via Internet Protocol (IP) geolocation, location via Wi-Fi® signal triangulation, location via detecting an NFC beacon signal that may indicate a particular location, and so forth.

"CARRIER SIGNAL" in this context refers to any intangible medium that is capable of storing, encoding, or carrying instructions 1416 for execution by the machine 1400, and includes digital or analog communications signals or other intangible media to facilitate communication of such instructions 1416. Instructions 1416 may be transmitted or received over the network 1480 using a transmission medium via a network interface device and using any one of a number of well-known transfer protocols.

"CLIENT DEVICE" in this context refers to any machine 1400 that interfaces to a network 1480 to obtain resources from one or more server systems or other client devices 102. A client device 102 may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 1480.

"COMMUNICATIONS NETWORK" in this context refers to one or more portions of a network 1480 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 1480 may include a wireless or cellular network and the coupling 1482 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation. Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EPHEMERAL MESSAGE" in this context refers to a message 400 that is accessible for a time-limited duration. An ephemeral message 502 may be a text, an image, a video, and the like. The access time for the ephemeral message 502 may be set by the message sender. Alternatively, the access time may be a default setting, or a setting specified by the recipient. Regardless of the setting technique, the message 400 is transitory.

"MACHINE-READABLE MEDIUM" in this context refers to a component, a device, or other tangible media able to store instructions 1416 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 1416. The term "machine-readable medium" shall also be taken to include any medium, or combination of multiple media, that is capable of storing instructions 1416 (e.g., code) for execution by a machine 1400, such that the instructions 1416, when executed by one or more processors 1410 of the machine 1400, cause the machine 1400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 1412 or a group of processors 1410) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1400) uniquely tailored to perform the configured functions and are no longer general-purpose processors 1410.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 1412 configured by software to become a special-purpose processor, the general-purpose processor 1412 may be configured as respectively different special-purpose processors (e.g., comprising different hardware components) at different times. Software accordingly configures a particular processor 1412 or processors 1410, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1410 that are temporarily configured (e.g., by software) or permanently configured to perform the relevant operations. Whether temporarily or permanently configured, such processors 1410 may constitute processor-implemented components that operate to perform one or more operations or functions described herein. As used herein, "processor-implemented component" refers to a hardware component implemented using one or more processors 1410. Similarly, the methods described herein may be at least partially processor-implemented, with a particular processor 1412 or processors 1410 being an example of hardware. For example, at least some of the operations of a method may be performed by one or more processors 1410 or processor-implemented components. Moreover, the one or more processors 1410 may also operate to support performance of the relevant operations in a "cloud computing" environment or as a "software as a service" (SaaS). For example, at least some of the operations may be performed by a group of computers (as examples of machines 1400 including processors 1410), with these operations being accessible via a network 1480 (e.g., the Internet) and via one or more appropriate interfaces (e.g., an API). The performance of certain of the operations may be distributed among the processors 1410, not only residing within a single machine 1400, but deployed across a number of machines 1400. In some example embodiments, the processors 1410 or processor-implemented components may be located in a single geographic location (e.g., within a home environment, an office environment, or a server farm). In other example embodiments, the processors 1410 or processor-implemented components may be distributed across a number of geographic locations.

"PROCESSOR" in this context refers to any circuit or virtual circuit (a physical circuit emulated by logic executing on an actual processor 1412) that manipulates data values according to control signals (e.g., "commands," "op codes," "machine code," etc.) and which produces corresponding output signals that are applied to operate a machine 1400. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 1410 may further be a multi-core processor 1410 having two or more independent processors 1412, 1414 (sometimes referred to as "cores") that may execute instructions 1416 contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
   generating, using one or more processors of a user device, an image sequence using an image sensor of the user device;
   displaying, on a display device of the user device, the image sequence in a live preview window;
   generating an elevated brightness element on the display device while the live preview window is displaying the image sequence, the elevated brightness element being brighter than the live preview window in the display device;
   capturing one or more images generated by the image sensor while the elevated brightness element and the live preview window are displayed on the display device; and
   resizing the live preview window in the display device, wherein the elevated brightness element is generated in an area of the display device that was occupied by the live preview window prior to resizing.

2. The method of claim 1, wherein the elevated brightness element is located external to the live preview window on the display device.

3. The method of claim 1, wherein the live preview window is resized by reducing screen dimensions of the live preview window.

4. The method of claim 3, wherein resizing the live preview window further comprises: resizing the image sequence to fit in the resized live preview window.

5. The method of claim 2, wherein the elevated brightness element curves around the live preview window in the display device.

6. The method of claim 1, wherein the elevated brightness element overlaps the live preview window to obfuscate a portion of the image sequence being displayed in the live preview window.

7. The method of claim 1, wherein the image sequence is displayed in the live preview window of the display device in real-time or near real time.

8. The method of claim 1, wherein capturing the one or images comprises storing the one or more images to memory of the user device while the elevated brightness element is displayed on the display device.

9. The method of claim 1, wherein elevated brightness element is displayed at a first brightness setting on the display device, and wherein storing the one or more images comprises:
   increasing the brightness of the elevated brightness element to a second brightness setting that is higher than then first brightness setting; and
   capturing the one or more images while the elevated brightness element is at the second brightness setting.

10. The method of claim 1, wherein in the display device is a display device on a front face of the user device, and wherein the image sensor is a front facing camera also located on the front face of the user device.

11. The method of claim 10, further comprising:
   generating, on the display device, a flash button while the image sequence is displayed on the front facing screen;
   receiving selection of the flash button, wherein the elevated brightness element is generated in response to the flash button being selected while the image sequence is previewable in the live preview window on the front facing screen of the user device.

12. The method of claim 10, further comprising:
detecting, by the user device, activation of the front facing camera, wherein the elevated brightness element is generated automatically in response to the activation of the front facing camera.

13. The method of claim 1, further comprising:
determining that the image sequence is darker than a darkness threshold; and
wherein the elevated brightness element is generated on the display device in response to determining that the live video is darker than the darkness threshold.

14. The method of claim 1, further comprising:
increasing global display brightness of the display device while the brightness element is being displayed, the global display brightness being a brightness value for an entire screen of the display device.

15. The method of claim 1, wherein the brightness element is brighter than live preview window due to the brightness element being lighter in color.

16. The method of claim 1, wherein the elevated brightness element is brighter than live preview window due to higher screen luminance values.

17. A system comprising:
one or more processors of a machine;
a display device;
an image sensor; and
a memory storing instructions that, when executed by the one or more processors, cause the machine to perform operations comprising:
generating an image sequence using the image sensor;
displaying, on the display device, the image sequence in a live preview window;
generating an elevated brightness element on the display device while the live preview window is displaying the image sequence, the elevated brightness element being brighter than the live preview window in the display device;
capturing one or more images generated by the image sensor while the elevated brightness element and the live preview window are displayed on the display device; and
resizing the live preview window in the display device, wherein the elevated brightness element is generated in an area of the display device that was occupied by the live preview window prior to resizing.

18. The system of claim 17, wherein the elevated brightness element is located external to the live preview window on the display device.

19. A machine-readable storage device embodying instructions that, when executed by a machine, cause the machine to perform operations comprising:
generating an image sequence using an image sensor;
displaying, on a display device, the image sequence in a live preview window;
generating an elevated brightness element on the display device while the live preview window is displaying the image sequence, the elevated brightness element being brighter than the live preview window in the display device;
capturing one or more images generated by the image sensor while the elevated brightness element and the live preview window are displayed on the display device; and
resizing the live preview window in the display device, wherein the elevated brightness element is generated in an area of the display device that was occupied by the live preview window prior to resizing.

* * * * *

UNITED STATES PATENT AND TRADEMARK OFFICE
CERTIFICATE OF CORRECTION

PATENT NO. : 11,113,797 B1  
APPLICATION NO. : 16/544460  
DATED : September 7, 2021  
INVENTOR(S) : Al Majid et al.

Page 1 of 1

It is certified that error appears in the above-identified patent and that said Letters Patent is hereby corrected as shown below:

On the Title Page

Item (57), in "Abstract", in Column 2, Line 4, after "screen", delete "in"

In the Claims

In Column 22, Line 42, in Claim 8, after "or", insert --more--

In Column 22, Line 52, in Claim 9, delete "then" and insert --the-- therefor

Signed and Sealed this  
Eighth Day of February, 2022

Drew Hirshfeld  
*Performing the Functions and Duties of the*  
*Under Secretary of Commerce for Intellectual Property and*  
*Director of the United States Patent and Trademark Office*